United States Patent [19]

Rantanen

[11] Patent Number: 5,023,030

[45] Date of Patent: Jun. 11, 1991

[54] METHOD FOR CASTING ONE OR SEVERAL CONCRETE PRODUCTS PLACED SIDE BY SIDE

[75] Inventor: Heikki Rantanen, Toijala, Finland

[73] Assignee: Oy Partek Ab, Toijala, Finland

[21] Appl. No.: 407,154

[22] Filed: Sep. 14, 1989

[30] Foreign Application Priority Data

Sep. 14, 1988 [FI] Finland .................. 884233

[51] Int. Cl.⁵ .............. B28B 1/08; B29C 43/22; B29C 47/60; B29C 47/92
[52] U.S. Cl. .............. 264/40.5; 264/40.7; 264/70; 264/209.1; 264/211.11; 264/211.23; 264/297.9; 425/64; 425/145; 425/149; 425/427
[58] Field of Search .......... 264/40.7, 40.1, 40.5, 264/70, 209.1, 211.11, 211.23, 297.9; 425/145, 149, 64, 262, 427

[56] References Cited

U.S. PATENT DOCUMENTS

| | | |
|---|---|---|
| 3,090,992 | 5/1963 | Schlachter et al. . |
| 3,175,477 | 3/1965 | Cheney . |
| 3,608,011 | 9/1971 | Jones .................. 264/70 |
| 3,704,972 | 12/1972 | Kneller et al. . |
| 3,728,056 | 4/1973 | Theysohn .......... 425/135 X |
| 3,799,719 | 3/1974 | Bonikowski et al. ...... 264/40.7 X |
| 3,930,782 | 1/1976 | Bigland . |
| 4,046,848 | 9/1977 | Putti .................. 264/70 |
| 4,066,725 | 1/1978 | Boettner .............. 264/40.5 |
| 4,145,155 | 3/1979 | Ogaki et al. . |
| 4,202,658 | 5/1980 | Ahonen .............. 264/70 X |
| 4,240,997 | 12/1980 | Jex .................. 264/40.5 |
| 4,550,002 | 10/1985 | Uhland et al. ...... 264/40.7 X |
| 4,574,064 | 3/1986 | Paakkinen . |
| 4,608,216 | 8/1986 | Barsk . |
| 4,668,447 | 5/1987 | Paakkinen .......... 264/70 |
| 4,671,908 | 6/1987 | Gwinn et al. ...... 264/40.7 |
| 4,754,413 | 6/1988 | Köster et al. ...... 264/40.7 X |
| 4,804,505 | 2/1989 | Venzke .............. 264/40.7 X |
| 4,867,664 | 9/1989 | Fukuhara .......... 264/40.5 X |
| 4,882,105 | 11/1989 | Volk, Jr. .......... 264/40.1 |

FOREIGN PATENT DOCUMENTS

| | | |
|---|---|---|
| 14125 | 8/1980 | European Pat. Off. ...... 264/40.5 |
| 841310 | 4/1984 | Finland . |
| 2204312 | 5/1974 | France . |
| 30678 | 10/1975 | Japan .............. 264/40.5 |
| 54538 | 3/1984 | Japan .............. 264/40.1 |
| 107315 | 6/1985 | Japan .............. 264/40.1 |
| 387289 | 5/1965 | Switzerland . |
| 802062 | 2/1981 | U.S.S.R. .......... 264/40.1 |
| 981005 | 12/1982 | U.S.S.R. .......... 264/40.1 |
| 1178598A | 4/1984 | U.S.S.R. . |
| 1148790 | 4/1985 | U.S.S.R. .......... 264/70 |
| 1212802 | 2/1986 | U.S.S.R. .......... 264/70 |
| 2020223 | 11/1979 | United Kingdom ...... 264/70 |
| 1586181 | 3/1981 | United Kingdom . |
| 83/01593 | 5/1983 | World Int. Prop. O. ...... 264/70 |

OTHER PUBLICATIONS

Brand, R. W., & Heiks, R. L., "Computerize Your Entire Extrusion System", Feb. 1972, Plastics Technology, pp. 37–39.

Primary Examiner—Jan H. Silbaugh
Assistant Examiner—Karen D. Kutach
Attorney, Agent, or Firm—Burns, Doane, Swecker & Mathis

[57] ABSTRACT

A method for casting of one concrete product or of several concrete products placed side by side at the same time by means of one casting machine as sliding casting out of high-consistency concrete mix. The concrete mix is fed by means of one feed member (2) or by means of several feed members placed side by side into one or several separate cross sections of a concrete product to be cast. The compacting of the concrete product or products to be cast is monitored by measuring the pressure of the concrete mix or the force arising from the pressure against a part (2; 9,7) of the casting machine in at least two points of the cross section and by separately regulating the operating values of at least two parallel feed member (2) or of the compacting movements of at least two parallel compacting members (3) on the basis of the measurement values obtained.

18 Claims, 5 Drawing Sheets

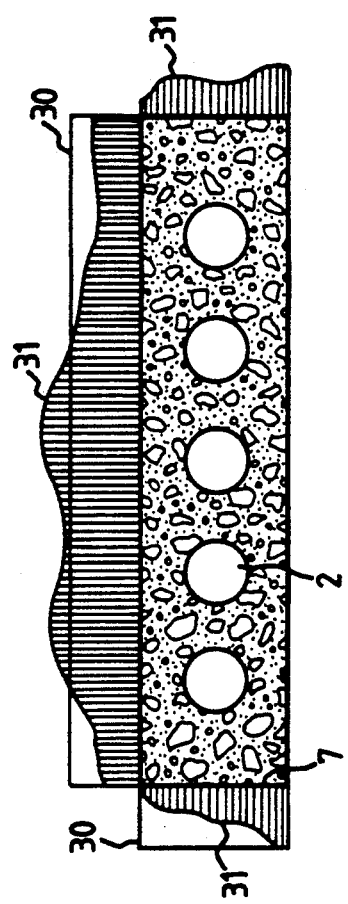
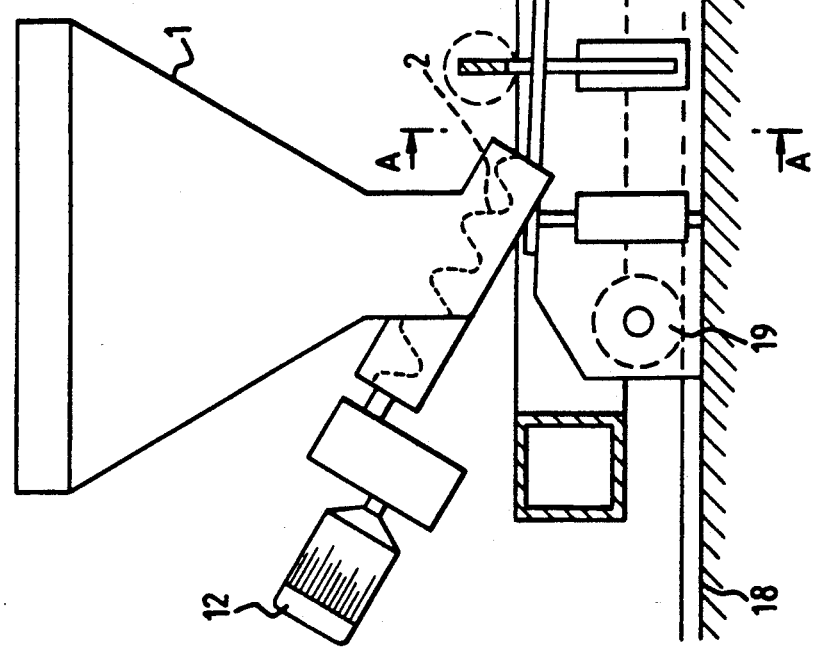

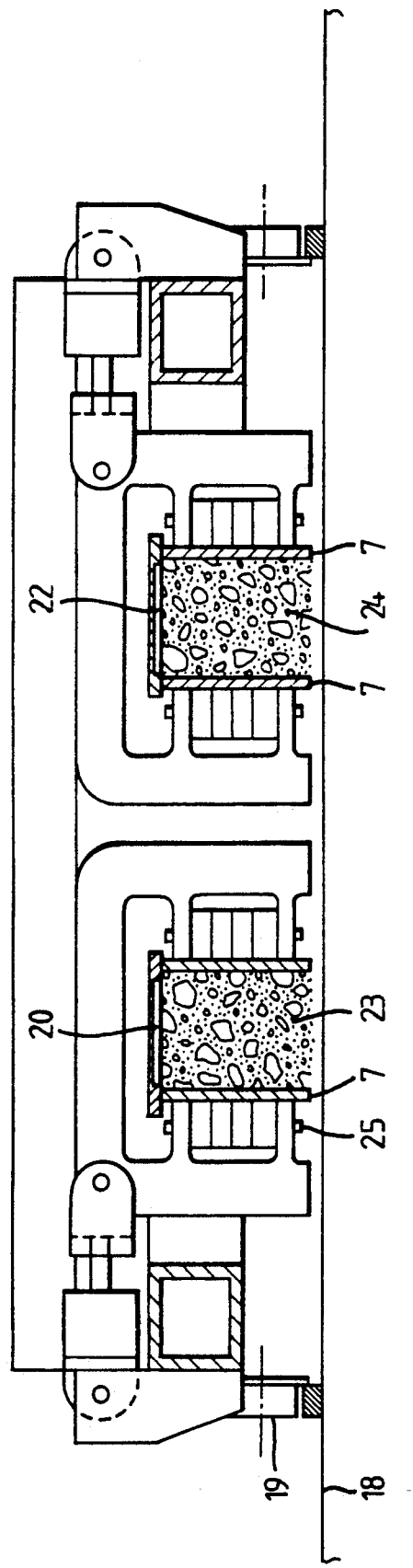

METHOD FOR CASTING ONE OR SEVERAL CONCRETE PRODUCTS PLACED SIDE BY SIDE

BACKGROUND OF THE INVENTION

The present invention concerns a method for the casting of one concrete product or of several concrete products placed side by side at the same time by means of one casting machine as sliding casting out of high-consistency concrete mix, the concrete mix being fed by means of one feed member or by means of several feed members placed side by side into one or several separate cross sections of a concrete product to be cast. The concrete mix being compacted by reducing the free spaces present between the aggregate particles in the concrete mix. The invention further concerns a slide-casting machine for casting of one or several concrete products placed side by side, said slide-casting machine provided with walls which form one or several cross sections of a concrete product to be cast as well as with one or several feed members placed side by side for feeding the concrete mix as well as with members for compacting of the concrete mix.

When products are manufactured out of concrete or of a corresponding material by using a casting machine of the extruder type, which is characterized in the use of feed screws and of compacting members that constitute extensions of same for the purpose of compacting the mix, one of the main problems consists of how to ensure and control uniform compacting of the section to be cast.

It has been possible to eliminate the problem to some extent by, based on experience, regulating the mutual ratio of the speeds of rotation of the parallel feed screws with invariable transmission ratios. However, wear of the feed members and variations in the properties of the mix alter the nature of the casting process and the compacting in the casting process constantly In the Finnish Patent No. 70,821 a slide-casting method for casting of hollow slabs out of concrete is described. Concrete mix is fed onto the casting base by means of a screw spiral that becomes thicker towards its final end. The mix is compacted further by means of a mobile mandrel fitted after the feed screw, whereby the mandrel, which moves relative an articulation point, produces a shearing-compacting effect. The movement of the feed screws also makes the casting machine itself move forward on the base.

From methods of extrusion of plastic products it is known to measure the axial force acting upon the feed screw or the pressure of the molten plastic and to regulate the speed of rotation of the feed screw on that basis. Such a method for casting of plastic is described, e.g., in the U.S. Pat. Nos. 3,704,972 and 3,090,992 as well as in the Swiss Patent No. 387,289. However, when a homogeneous plastic mix is being cast, a change in the speed of rotation of the feed screw does not affect the compacting pressure, but by means of its regulation the output of the machine is affected.

In the British Pat. No. 1,586,181 a slide-casting machine is described in which the wheels mounted underneath the machine are connected to the drive mechanism so as to carry the machine on the casting base. The transfer output fed to the wheels is regulated on the basis of the torque or forces acting upon the feed screw. In this way the compacting effect of the feed screws in the direction of running of the machine can be made as uniform as possible. In the apparatus it is, however, not possible to regulate the compacting separately in different points of the same cross section.

In studies and in practical casting processes it has been noticed that the compacting process requires two main components:

pressure +vibration or pressure +shear-compacting effect.

In particular when a so-called high-consistency concrete mix is used, the pressure component has a very high significance.

This high significance of the pressure component makes it possible to employ said pressure component for the control of the entire compact process.

Summary of the Present Invention

The method in accordance with the present invention is characterized in that the compacting of the concrete product or products to be cast is monitored by measuring the pressure of the concrete mix or the force arising from the pressure against a part of the casting machine in at least two points of the cross section or in at least two separate cross sections and by separately regulating the operating values of the feed movements of at least two parallel feed members or of the compacting movements of compacting members on the basis of the measurement values obtained. The slide-casting machine in accordance with the invention is characterized in that the slide-casting machine is provided with measurement members for measuring the pressure of the concrete mix or the force arising from the pressure against a part of the casting machine in at least two points of the cross section or in at least two separate cross sections as well as means for regulating the operating values of the feed movements of at least two parallel feed members or of the compacting movements of at least two parallel compacting members on the basis of the measurement values obtained separately from each other.

One usable solution is as follows:

The feed members (feed screws) are provided with members (detectors) for the measurement of the axial force, and the axial forces of parallel feed members are adjusted to an invariable level or to a desired ratio to one another by regulating the speeds of rotation of the feed screws in accordance with an axial force that is measured automatically. Herein it is possible to employ a regulating technique known in prior art. At the same time, if necessary, the overall running resistance of the machine is set at a desired invariable level by using, e.g., friction wheels or corresponding devices.

One important application of the present invention is simultaneous manufacture of several separate pieces, in which case the suggested control of the compacting process is a basic prerequisite for a successful process.

By means of the invention it can be ensured that the concrete mix is compacted uniformly at different points of the cross section and in separate cross sections in the desired way.

BRIEF DESCRIPTION OF THE DRAWINGS

The invention and its details will be described in more detail in the following with reference to the accompanying drawings, wherein FIG. 4 shows a cross section of a hollow slab to be cast and its pressure profiles, FIG. 5 is an illustration of principle and a side view of a slide-casting machine of a different type, and FIG. 6 shows a section taken along line A-A in the machine shown in FIG. 5.

DETAILED DESCRIPTION OF THE PREFERRED EMBODIMENTS

Figure 1:
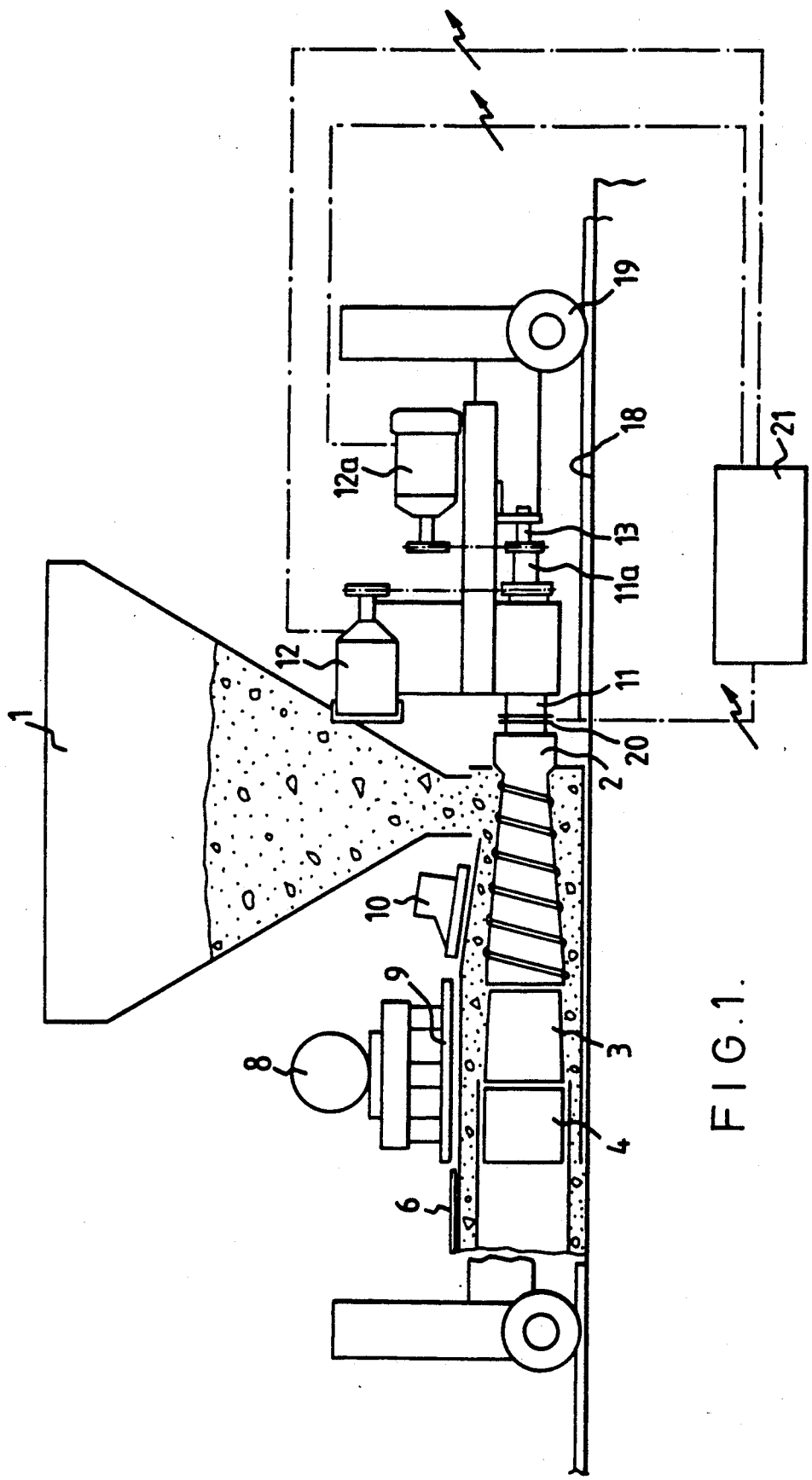
FIG. 1 is a partly sectional side view of one embodiment of a slide-casting machine in accordance with the invention.
Figure 2:
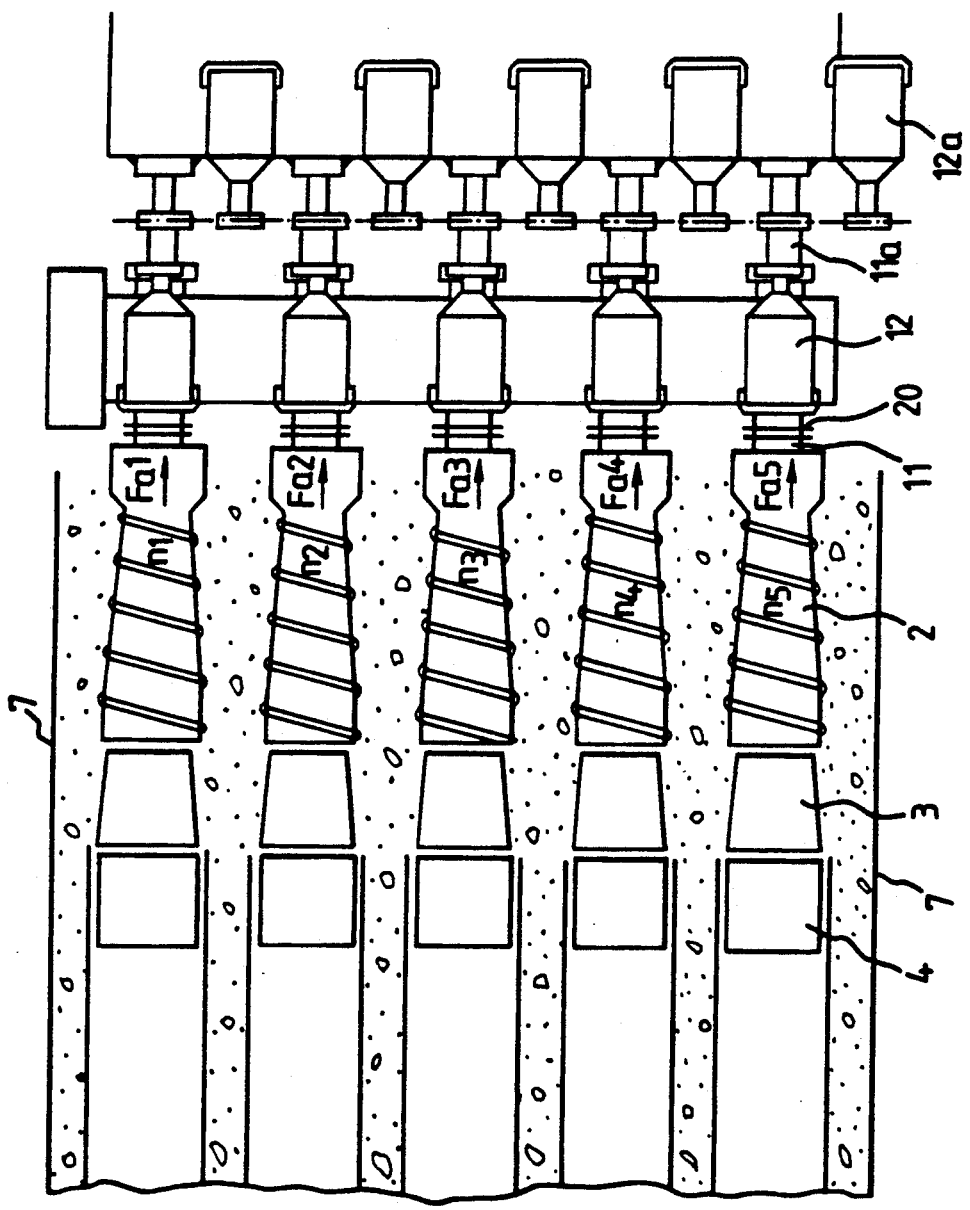
FIG. 2 shows the same machine as viewed from above and without a feed funnel.

FIGS. 1 and 2 show a slide-casting machine. The feed funnel 1 is mounted at the initial end of the slide-casting machine. Depending on the size of the slab to be cast, the machine comprises, e.g., 3 to 8 spiral screws 2, which are in such a way conical that they become larger towards the final end of the machine. After the spiral screw 2 a hollow mandrel 3 is fitted, which is followed by a follower tube 4. The device further comprises side plates 7 and a deck plane, which consists of a front rib 10, a compacting plate 9, and of a follower plate 6. Above the deck plane a drive mechanism is fitted, by means of which the desired path of movement is obtained for the compacting plate 9. By means of the front rib 10 placed at the front side of the deck plane it is possible to regulate the mix flow. The locations and positions of the various parts of the deck plane can be positioned in the desired way.

Each screw 2 is fixed to a shaft 11, which is driven by means of a motor 12. Each shaft has a motor 12 of its own. The shaft 11a extends through the screw 2 and through the shaft 11 up to the initial end of the hollow mandrel 3, and it is driven by a motor 12a. Likewise, each shaft 11a has a motor 12a of its own. The machine moves on the base 18 supported on the wheels 19 to the right in FIG. 1. The friction between the wheels 19 and their shafts can be adjusted so that the overall running resistance of the machine can be regulated to the desired level. The hollow mandrel 3 is supported by means of a support shaft 13 passing through the drive shaft 11a of the mandrel. The fastening of the initial end of the hollow mandrel on the shaft 11a is eccentric, whereat the mandrel moves as supported on the ball joint placed at the final end of the mandrel while the shaft 11a revolves. The mechanical principle and construction of the compacting members are described in detail in the Finnish Pat. No. 70,821.

The shaft 11 of each feed screw 2 is provided with a detector 20 which measures the axial force $F_{a1}...F_{a5}$. The measurement data are processed in a central processor 21, from which the commands are given for setting the set values of the motors 12 and 12a. When, for example, the speeds of rotation of the motors 12 are regulated, the speeds of rotation $n_1...n_5$ of the feed screws 2 are acted upon. In this way, each screw can be made to feed the mix so that the mix is compacted as uniformly as possible across the entire cross section. In addition to the speeds of rotation of the motors 12, in a corresponding way, it is possible to regulate the speeds of rotation of the motors 12a and to act upon the frequency of the compacting movements of the mandrels 3.

The invention is also suitable for use in machines which apply a concrete compacting principle of a different type, for example in a slide-casting machine for hollow slabs wherein the compacting mandrels are provided with high-frequency vibrators.

Figure 3:
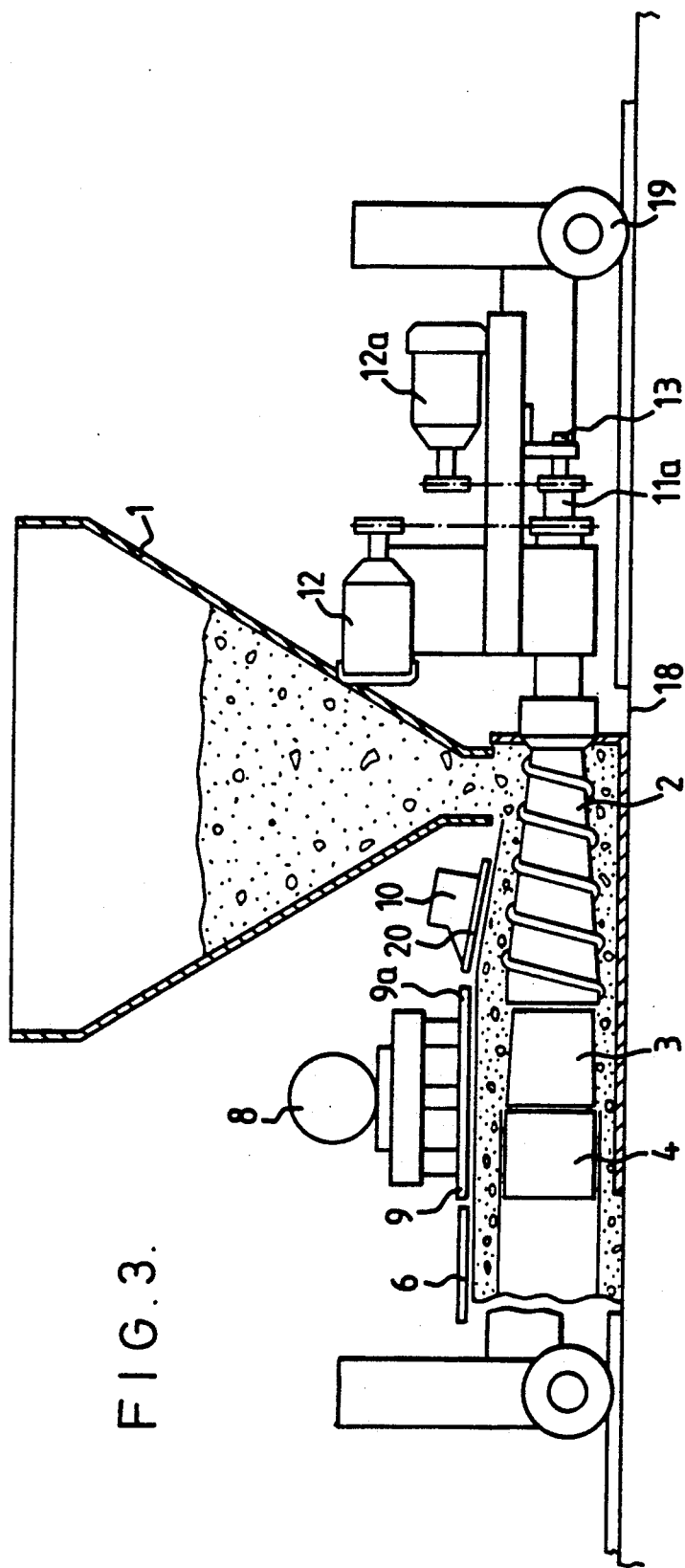
FIG. 3 is a partly sectional side view of a second embodiment of a slide-casting machine in accordance with the invention.

FIGS. 3 and 4 illustrate an alternative embodiment of the invention. Instead of detectors that measure the axial force of the feed screws 2, in this solution plate-shaped detector elements 20 are used, which are fitted on the faces of the nozzle part of the casting machine, i.e. at the initial end 9a of the deck plane or on the front rib 10 and on the side plates 7 and which measure the pressure profile of the concrete product. As detectors, it is possible to use, e.g., plastic membrane detectors in themselves known and protected in a purposeful way against the abrading effect of the concrete mix. One example of a suitable membrane detector is a PVDF (polyvinylidene fluoride) membrane based on the piezo-electric behaviour of a material.

In FIG. 4 the lines 30 represent the desired pressure profile, and the lines 31 illustrate an assumed pressure profile with prior-art methods. On the basis of the pressure profile measured by means of detectors the operating values of the feed screws 2 and/or the compacting members 3 are regulated to the desired levels. The number of the detectors to be placed side by side depends on the desired accuracy of the profile. The locations of the detectors may be varied, but most appropriately they are placed at the proximity of the final ends of the feed screws and of the initial ends of the compacting mandrels.

FIGS. 5 and 6 show a slide-casting machine wherein the concrete feed screws 2 are placed outside the cross section to be cast and the shuttering construction is provided with pressure detectors 20 and 22, the operating values of the feed screws being regulated in respect of each cross section on the basis of the pressure information supplied by the pressure detectors. FIG. 6 shows a cross section taken at the line A—A in FIG. 5 and the locations of the detectors in connection with the upper wall of the shuttering construction. The locations of the detectors in the longitudinal direction of the shuttering are optimal at the proximity of the feed screws, but their locations may vary, and it is also possible to use several detectors placed one after the other at the same time. In a slide-casting machine in accordance with FIGS. 5 and 6 the compacting of the concrete is carried out, e.g., by means of a synchronized lateral movement of the side walls of the shuttering, as is described in the Finnish Pat. No. 64,072, or in some other way known in prior art, e.g. by means of vibration. By means of the casting machine shown in FIG. 5, two solid-section concrete products 23 and 24 are cast at the same time. The side walls move around the articulated shafts 25.

On the basis of the measurement values, it is also possible to regulate compacting members of other sorts, different from those described above. It is possible to regulate, e.g., the amplitude of the movement of a wall which pivots around an articulated shaft. Likewise, it is possible to regulate the frequency of oscillation of a vibrated wall.

The operating values of a compacting member refer to all quantities definable by means of distance and/or time, such as speed of rotation, velocity, amplitude, phasing of compacting movements, etc.

The drive arrangement of the feed members and of the compacting members can be accomplished by means of power transmission arrangements in themselves known, e.g. hydraulically, by means of mechanical variators, by means of frequency-converter drives, or by means of DC-drives.

Above, embodiments of the invention have been described in slide-casting processes in which the casting machine moves relative the base and the product. Of course, the invention is also suitable for use in casting processes in which the casting machine itself is stationary in its position and the product to be cast and, if necessary, the casting base that supports the product move relative the casting machine. The principle of such a process is described, e.g., in the Finnish Pat. Application No. 841310.

Instead of feed screws, it is also possible to employ feed members of other types and to regulate them. For example, it is possible to use chamber feeders or piston-type feeders.

In the regulating system, it is possible to use regulating technique, microprocessors, etc. in themselves known. The regulation can be programmed in any desired way depending on the desired degree of automation.

What is claimed is:

1. A method for casting at least one concrete product from a high-consistency concrete mix by means of a slide-casting machine, comprising the steps of:
    feeding the concrete mix by means of at least two parallel feed members placed side by side into at least one cross section of the concrete product to be cast;
    compacting the concrete mix by reducing free spaces present between aggregate particles in the concrete mix with a compacting member to form the concrete product;
    monitoring the compacting of the concrete mix by measuring the pressure of the concrete mix acting upon a part of the slide-casting machine in at least two points of the cross section of the concrete product; and
    regulating operating values of the feed movements of each of the parallel feed members separately of each other and regulating operating values of the compacting movements of the compacting member in response to the measurement values obtained to thereby ensure substantially uniform compaction of the cross section of the concrete product.

2. Method as claimed in claim 1, wherein axial forces of feed screws that operate as the feed members are measured.

3. Method as claimed in claim 1, wherein the pressure acting upon a wall of the slide-casting machine is measured.

4. Method as claimed in claim 1, wherein speeds of rotation of feed screws which operate as the feed members are regulated on the basis of the measurement result.

5. Method of claim 1, wherein the monitoring step includes measuring force arising from the pressure against a part of the slide-casting machine.

6. Method as claimed in claim 1, wherein movement of the compacting member is regulated on the basis of the measurement result.

7. Method of claim 6, wherein amplitude of the movement of the compacting member is regulated.

8. Method as claimed in claim 1, wherein running resistance of the slide-casting machine that runs on a casting base relative to the casting base is set at a desired level.

9. Method of claim 8, wherein the running resistance is set by means of a mechanical arrangement.

10. Method of claim 8, wehrein the running resistance is set by means of a electrical arrangement.

11. Method of claim 1, wherein the concrete mix is compacted by a plurality of parallel compacting members 12. Method of claim 11, wherein the operating values of the feed movements of the plurality of feed members and the operating values of the plurality of compacting members are separately regulated.

13. Method of claim 1, wherein a plurality of products are cast side by side at the same time by the same machine.

14. Method of claim 13, wherein the concrete mix is compacted by a plurality of parallel compacting members.

15. Method of claim 14, wherein the operating values of the feed movements of the plurality of feed members and the operating values of the plurality of compacting members are separately regulated.

16. Method of claim 14, wherein relative phasing of the movement of the compacting members is regulated.

17. A method for casting one concrete products from a high-consistency concrete mix by means of a slide-casting machine, comprising the steps of:
    feeding the concrete mix by means of a feed member into at least one cross section of the concrete product to be cast;
    compacting the concrete mix by reducing free spaces present between aggregate particles in the concrete mix with a compacting member to form the concrete product;
    monitoring the compacting of the concrete mix by measuring the pressure of the concrete mix acting upon a part of the slide-casting machine in at least two points in the cross section of the concrete product; and
    separately regulating operating values of feed movements of the feed member and of compacting movements of the compacting member in response to the measurement values obtained to thereby ensure substantially uniform compaction of the cross section of the concrete product.

18. Method of claim 17, wherein the two points are in separate cross sections.

* * * * *